(12) United States Patent
Mundell et al.

(10) Patent No.: US 7,775,603 B2
(45) Date of Patent: Aug. 17, 2010

(54) SEAT SUSPENSION SYSTEM AND SEAT CUSHION MODULE HOLDER

(75) Inventors: Donald David Mundell, Carthage, MO (US); Joe Reu, Sarcoxie, MO (US); Harold Long, Sarcoxie, MO (US)

(73) Assignee: L & P Property Management Company, South Gate, CA (US)

( * ) Notice: Subject to any disclaimer, the term of this patent is extended or adjusted under 35 U.S.C. 154(b) by 325 days.

(21) Appl. No.: 11/427,672

(22) Filed: Jun. 29, 2006

(65) Prior Publication Data
US 2008/0001464 A1    Jan. 3, 2008

(51) Int. Cl.
A47C 7/02    (2006.01)
(52) U.S. Cl. .................................................. 297/452.52
(58) Field of Classification Search ............ 297/452.52, 297/452.53, 452.54, 284.4, DIG. 2; 5/239
See application file for complete search history.

(56) References Cited

U.S. PATENT DOCUMENTS

| | | | |
|---|---|---|---|
| 3,659,319 A | | 5/1972 | Erickson |
| 4,467,987 A | | 8/1984 | Small et al. |
| 4,576,664 A | | 3/1986 | Delahunty et al. |
| 4,840,334 A | | 6/1989 | Kikuchi et al. |
| 5,114,209 A | | 5/1992 | Dunn |
| 5,143,057 A | | 9/1992 | DePasquale |
| 5,468,048 A | * | 11/1995 | Clemens et al. .......... 297/284.4 |
| 5,762,397 A | * | 6/1998 | Venuto et al. ............ 297/284.4 |
| 5,947,426 A | | 9/1999 | Kraus et al. |
| 5,988,745 A | * | 11/1999 | Deceuninck ............. 297/284.4 |
| 6,068,048 A | | 5/2000 | Cude |
| 6,116,694 A | * | 9/2000 | Bullard .................. 297/452.52 |
| 6,125,521 A | | 10/2000 | Stumpf et al. |
| 6,179,362 B1 | | 1/2001 | Wisniewski et al. |
| 6,234,578 B1 | | 5/2001 | Barton et al. |
| 6,595,585 B2 | * | 7/2003 | Mundell .................. 297/284.4 |
| 6,688,686 B1 | | 2/2004 | McEvoy et al. |
| 6,739,673 B2 | | 5/2004 | Gupta et al. |
| 6,758,522 B2 | | 7/2004 | Ligon, Sr. et al. |

(Continued)

FOREIGN PATENT DOCUMENTS

EP    1270317 A    1/2003

(Continued)

OTHER PUBLICATIONS

PCT International Search Report for PCT/US2007/072352.

*Primary Examiner*—Milton Nelson, Jr.
(74) *Attorney, Agent, or Firm*—Kang Intellectual Property Law, LLC; Grant D. Kang (57) ABSTRACT

A suspension system for a vehicle seat comprising a support wire having a first end, a second end, and a middle portion between the first and second ends, such that the support wire is folded approximately in half at the middle portion. The suspension system further comprises a coating of overmolded plastic applied to the first and second ends such that the first end second ends are held together by the coating; a bend in the middle portion of the support wire to attach the support wire to a frame of the vehicle seat, wherein the bend is coated with overmolded plastic; a crossbar overmolded on the support wire; an integral attachment clip molded onto the crossbar; and a seat cushion module held adjacent the support wire using the integral attachment clip.

18 Claims, 9 Drawing Sheets

U.S. PATENT DOCUMENTS

| | | |
|---|---|---|
| 6,811,218 B2 | 11/2004 | Deimen et al. |
| 6,996,604 B2 | 11/2005 | Stumpf et al. |
| 6,997,515 B2 | 2/2006 | Gupta et al. |
| 2005/0173957 A1* | 8/2005 | Schwarzbich et al. .... 297/284.4 |

FOREIGN PATENT DOCUMENTS

| | | |
|---|---|---|
| EP | 1593547 A | 11/2005 |
| FR | 2759649 A | 8/1998 |
| JP | 2001120383 A | 5/2001 |
| JP | 2007-313045 | 12/2007 |
| WO | WO 01/10670 A | 2/2001 |

\* cited by examiner

SEAT SUSPENSION SYSTEM AND SEAT CUSHION MODULE HOLDER

CROSS-REFERENCE TO RELATED APPLICATIONS

None.

BACKGROUND OF THE INVENTION

1. Field of the Invention

The present invention relates to seat suspension systems for vehicles, in particular to seat suspension systems adapted to hold a seat cushion module.

2. Related Art

The underside of the modern vehicle seat is now becoming an electronic maze of gadgets. Numerous control and sensing modules, typically rectangular boxes, must be assembled into the seat suspension system. Many of the presently-used methods of assembling seat suspension systems and of suspending control modules therefrom are undesirable due to their labor-intensive assembly requirements.

There are numerous types of seat cushion modules that are suspended from a seat bottom. There are memory modules for seat settings (e.g. changing the height, distance from steering wheel, seat back tilt, etc.), air bag sensing (to determine if passenger seat is occupied and how heavy the occupant is), seat heater, air conditioning blower (for sensing circulation of cool air in seat), and others. For some seats, these modules are mounted by attachment of a metal structure to the seat frame. Other seats have an additional metal bracket specifically designed to hold the above-mentioned units. The bracket may be welded or screwed to the underside of the seat cushion frame. The modules will then be attached to the metal bracket. However, the cost of materials and labor, not to mention the added weight, of such metal brackets make this approach costly.

In addition to suspending a seat cushion module, another consideration that goes into manufacturing a seat suspension system is electrical insulation of the suspension wires so that the wires do not make electrical contact with the seat frame to which they are attached. One way that this has been achieved is by powder-coating the wires.

Finally, the seat suspension often comprises two or more wires, usually bent to cover a wider area, wherein the wires must be joined together to make a unitary suspension structure. A common way to join the wires together is to use additional wires that are twisted around the suspension wires to couple the suspension wires into a unitary structure. However, joining these wires together is also a labor-intensive, and hence costly, procedure.

What is needed is an improved seat suspension design which is easier to assemble than previous designs and is better adapted for receiving control modules for seat-related technologies.

SUMMARY OF THE INVENTION

In one embodiment the invention is a suspension system for a vehicle seat comprising a support wire; a crossbar overmolded on the support wire; and a plastic coating molded on at least one end of the support wire.

In another embodiment the invention is a suspension system for a vehicle seat comprising a support wire having a first end, a second end, and a middle portion between the first and second ends, such that the support wire is folded approximately in half at the middle portion. The suspension system further comprises a coating of overmolded plastic applied to the first and second ends such that the first end second ends are held together by the coating; a bend in the middle portion of the support wire to attach the support wire to a frame of the vehicle seat, wherein the bend is coated with overmolded plastic; a crossbar overmolded on the support wire; an integral attachment clip molded onto the crossbar; and a seat cushion module held adjacent the support wire using the integral attachment clip.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1A:
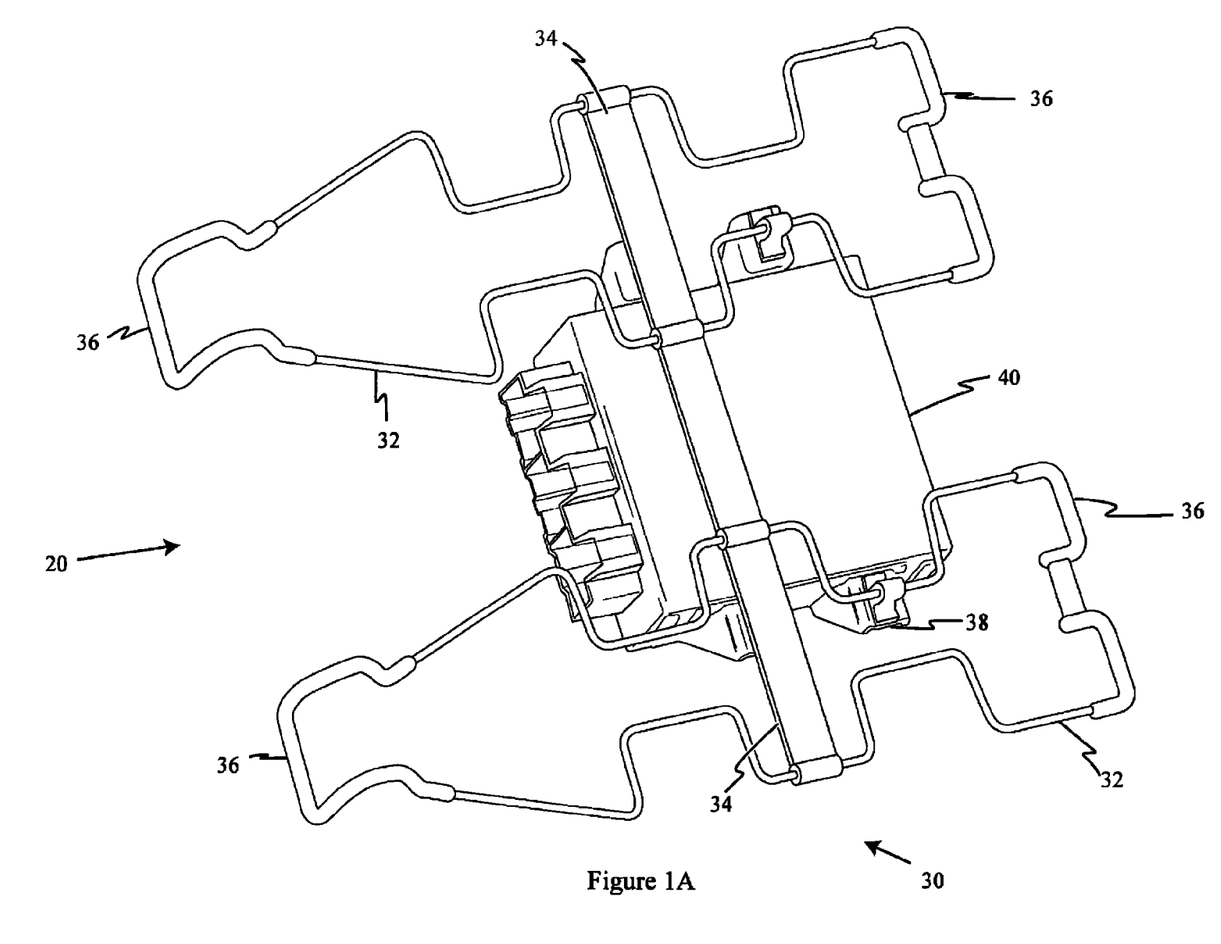
FIG. 1A shows one embodiment of a seat suspension system with a seat cushion module attached thereto.

A seat suspension system 20 of the present invention comprises at least one support wire 32, at least one cross support 34 overmolded onto the support wire 32, and overmolded plastic 36 on the ends of the wire 32 (FIG. 1A). Overmolding, sometimes called 'insert molding', involves inserting a metal or other piece into a mold prior to injecting plastic, such that the final molded part has one or more piece embedded in the molded plastic. The support wire(s) 32 preferably cover most of the area of the seat base cushion in order to provide even support across the surface. In the embodiments depicted herein there are two support wires 32 per single-occupant seat, where each wire is bent in half so that four strands of wire stretch across the seat base, generally from front to back (FIG. 1A). In addition the support wires 32 have a series of lateral bends in them so that they cover a greater area. Although the depicted embodiments show two identical support wires 32 molded together, the two wires could also differ from one another, for example to accommodate different shapes and sizes of seats.

Figure 1B:
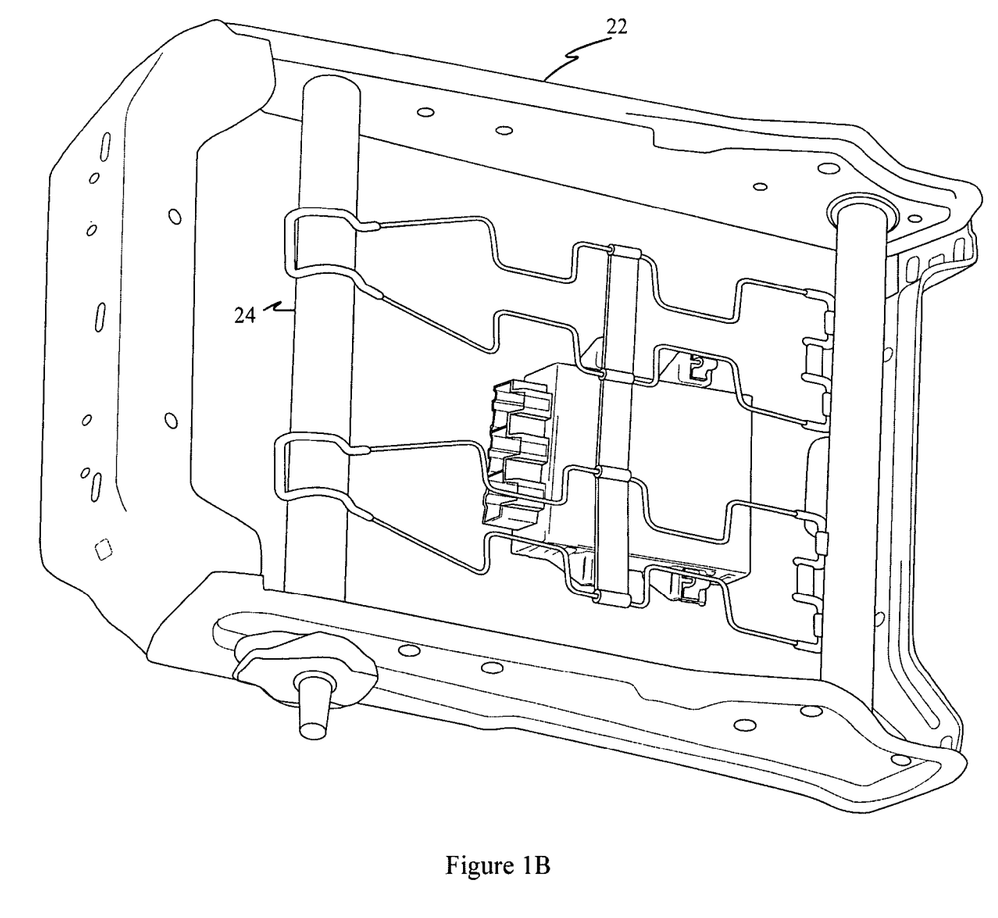
FIG. 1B shows an embodiment of a seat suspension system with a seat cushion module attached thereto, mounted in the base portion of a seat frame.

The ends of the support wires 32 attach to the seat frame 22 (FIG. 1B). In one embodiment a first end of the support wire 32, which in one embodiment is the middle portion of a wire that is folded in half, is curved so that it wraps around a support bar 24 on the seat frame 22 (FIG. 1B). A second end of the support wire 32, which in one embodiment comprises the two free ends of the wire overmolded together, are latched into hooks on the seat frame 22. Overmolding the two free ends of the support wire 32 together helps it maintain a constant shape and keeps the ends of the wires spaced at the same distance, which facilitates assembly. In one embodiment the first and second ends of the support wire 32 are coated with a layer of plastic during the overmolding process in order to electrically insulate the wires, to prevent an electrical connection between the support wires 32 and the seat frame 22. Thus in a single step the support wires 32 may be overmolded at the ends with the aforementioned plastic coating as well as in the middle with one or more cross support 34, drastically reducing the assembly costs for the seat suspension system 20.

Many seats require a cushion module 40, comprising a rectangular box with electronic components inside, to be mounted on the underside of the seat for various purposes including sensing the presence and size of a seat occupant for purposes of air bag activation. The present invention discloses an improved method of attaching this module which is less costly and which holds the module onto the seat more reliably than many previous systems.

Figure 2A:
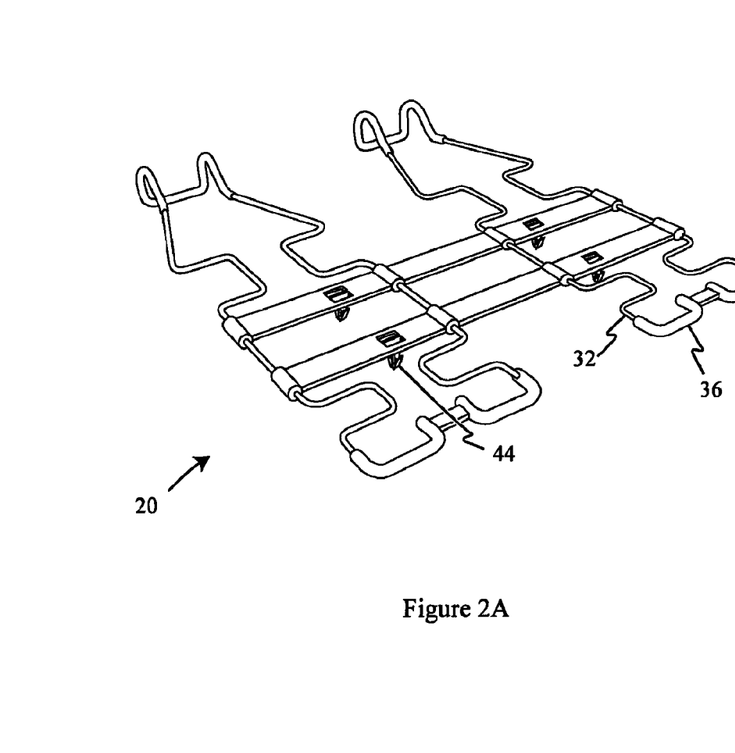
FIG. 2A shows an embodiment of a seat suspension system.
Figure 2B:
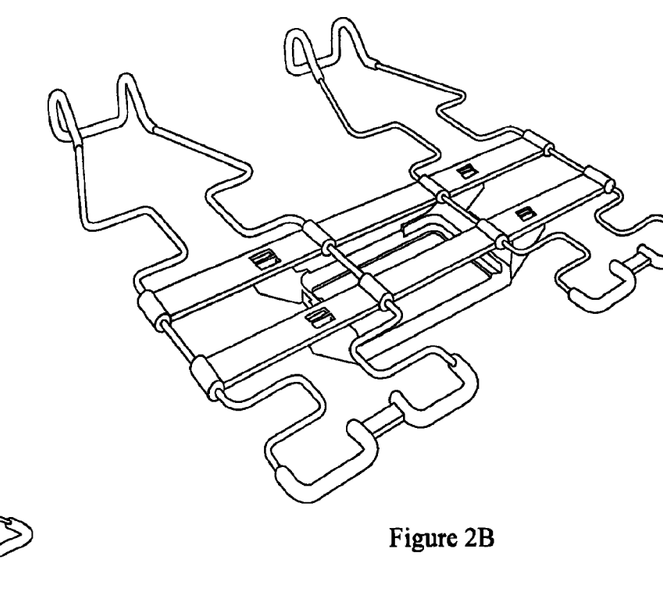
FIG. 2B shows an embodiment of a seat suspension system having attached thereto a shelf for holding a seat cushion module.
Figure 5A:
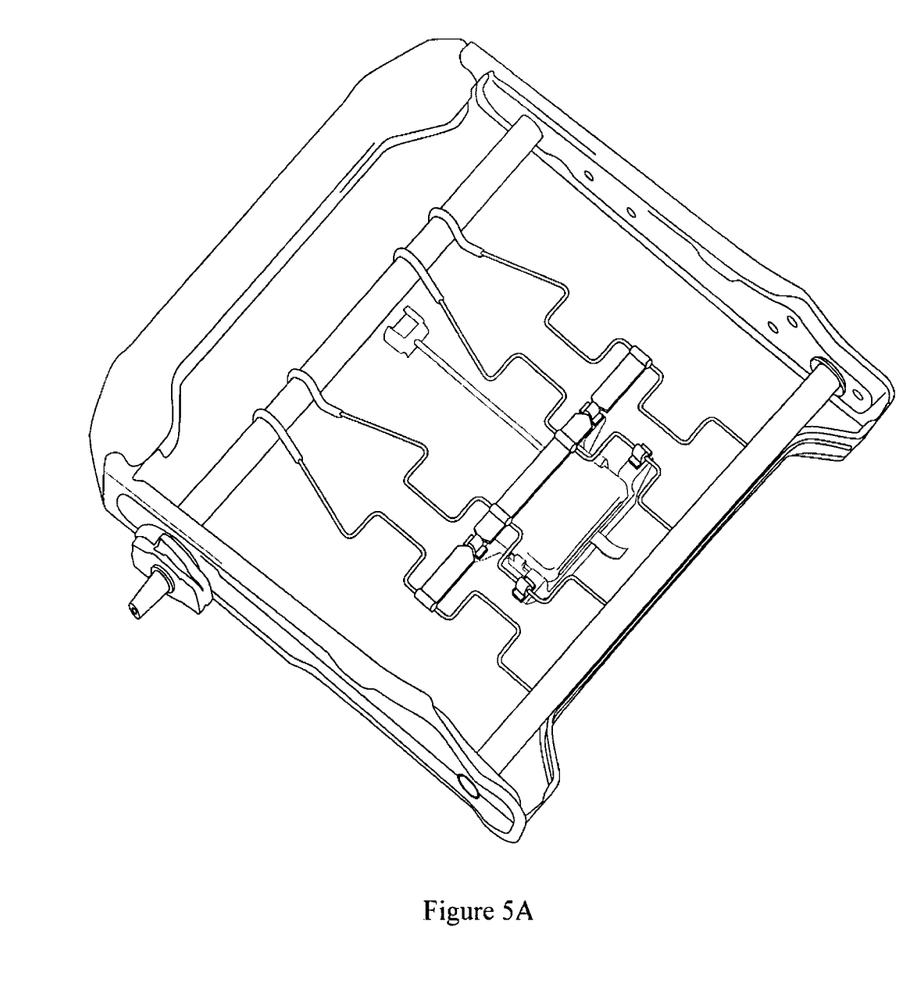
FIG. 5A shows an embodiment of a seat suspension system attached to a seat frame.
Figure 5B:
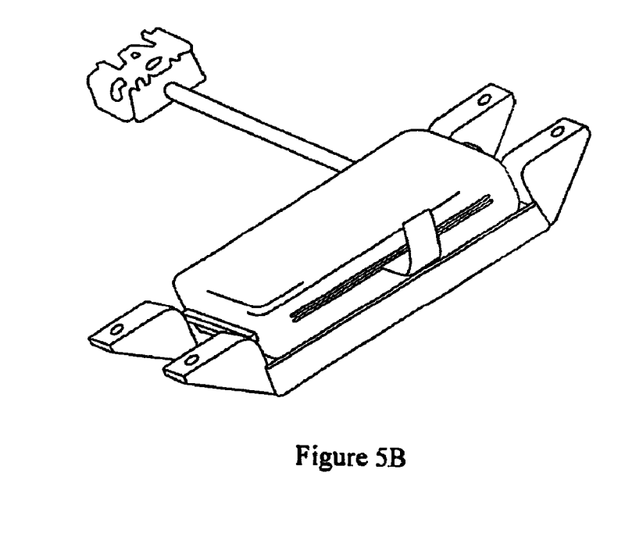
FIG. 5B shows how the seat cushion module fits into the shelf in one embodiment.
Figure 5C:
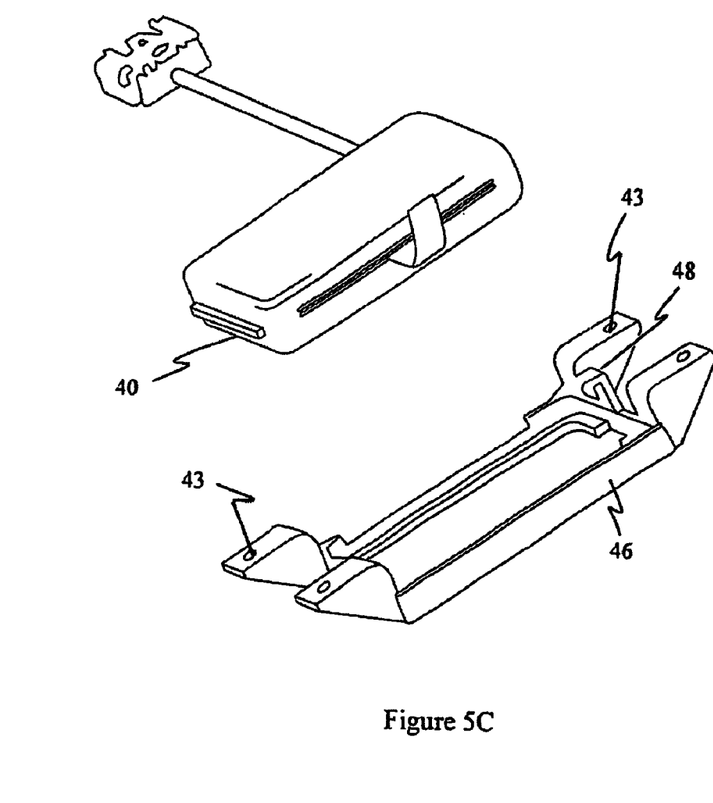
FIG. 5C shows the seat cushion module and the shelf as in the embodiment of FIG. 5B.
Figure 6A:
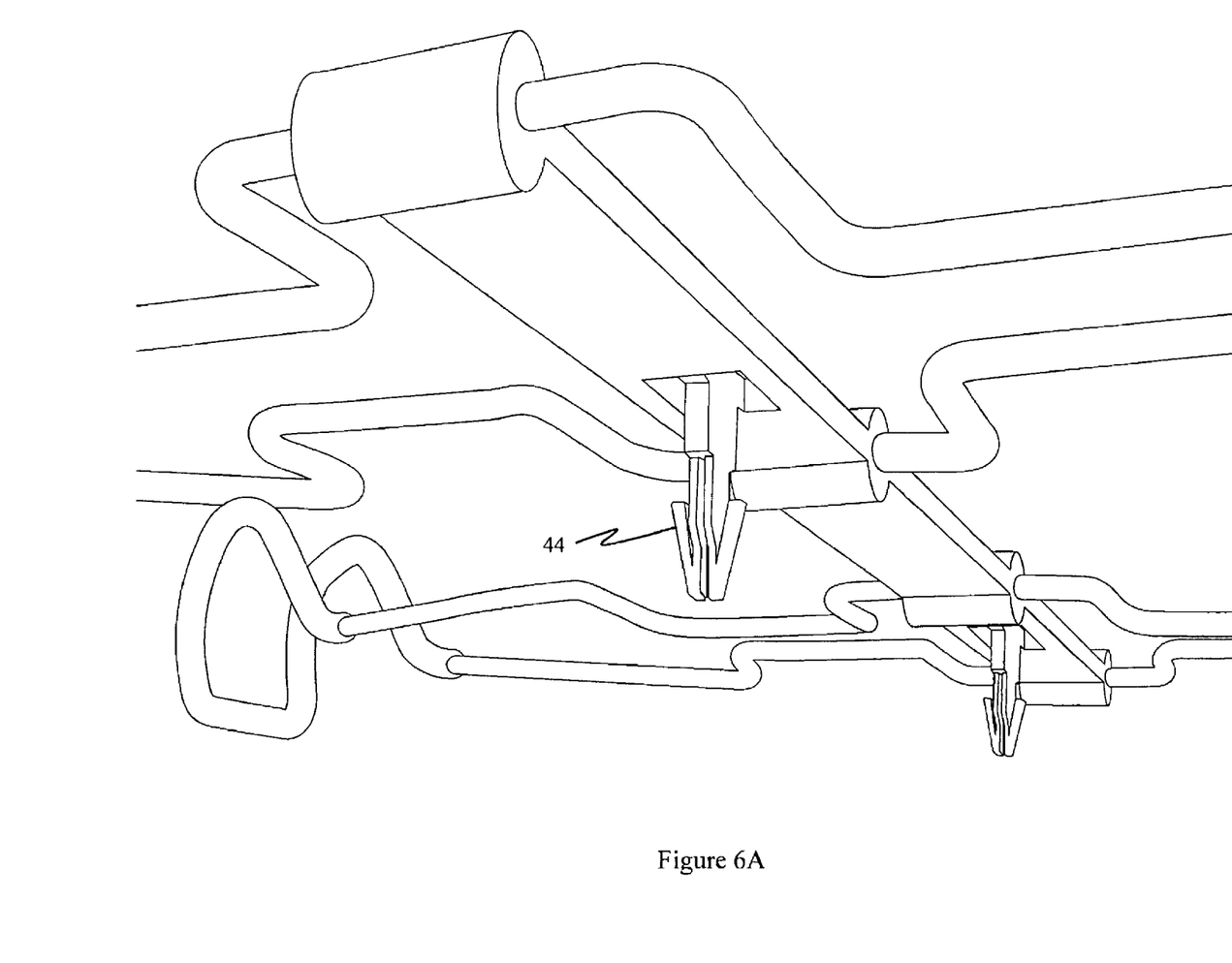
FIG. 6A shows a close-up view of the overmolded cross support of certain embodiments, and in particular shows the attachment clips integrally molded therein.
Figure 6B:
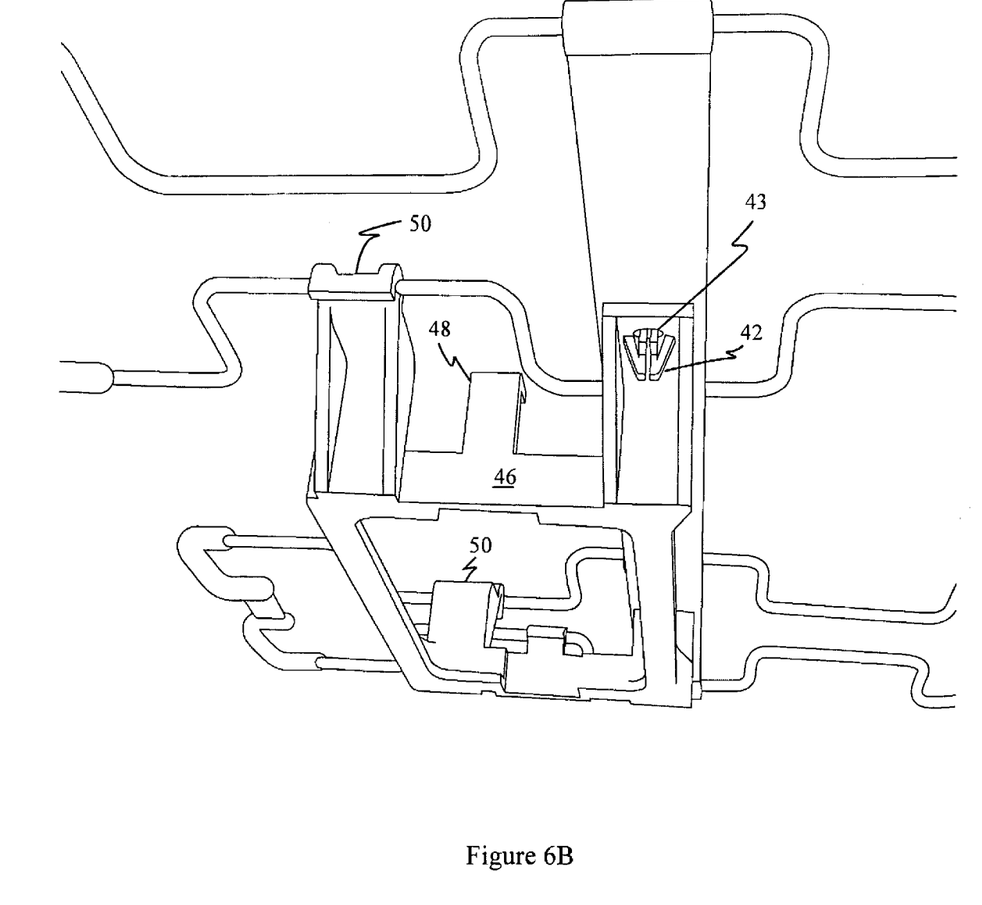
FIG. 6B shows a view from the underside of one embodiment of a suspension system with a shelf attached thereto using integrally molded clips on the cross support and hooks molded into the shelf for attachment to the support wires.

A seat cushion module suspension system 30 of the present invention comprises a seat suspension system 20 along with means for suspending a seat cushion module 40 onto the underside of the seat base (FIG. 1A). In one embodiment such means comprise one or more bracket 38 attached directly to the seat cushion module 40 (FIG. 1A), sometimes referred to as attachment 'ears'. The bracket 38 may be attached to the seat suspension system 20 by non-integral clips 42 that wrap around the support wire 32, or there may be clips 44 integrally molded into the cross support 34 (FIGS. 2A, 2B). The bracket 38 has appropriately-sized and -shaped holes 43 for receiving the clips 42, 44 (FIGS. 5C, 6B). In one embodiment, the non-integral clips 42 are of a type described in U.S. Pat. No. 5,762,397, wherein the clip 42 wraps around a wire or rod and wherein the ends of clip 42 are snapped into a hole.

Figure 3:
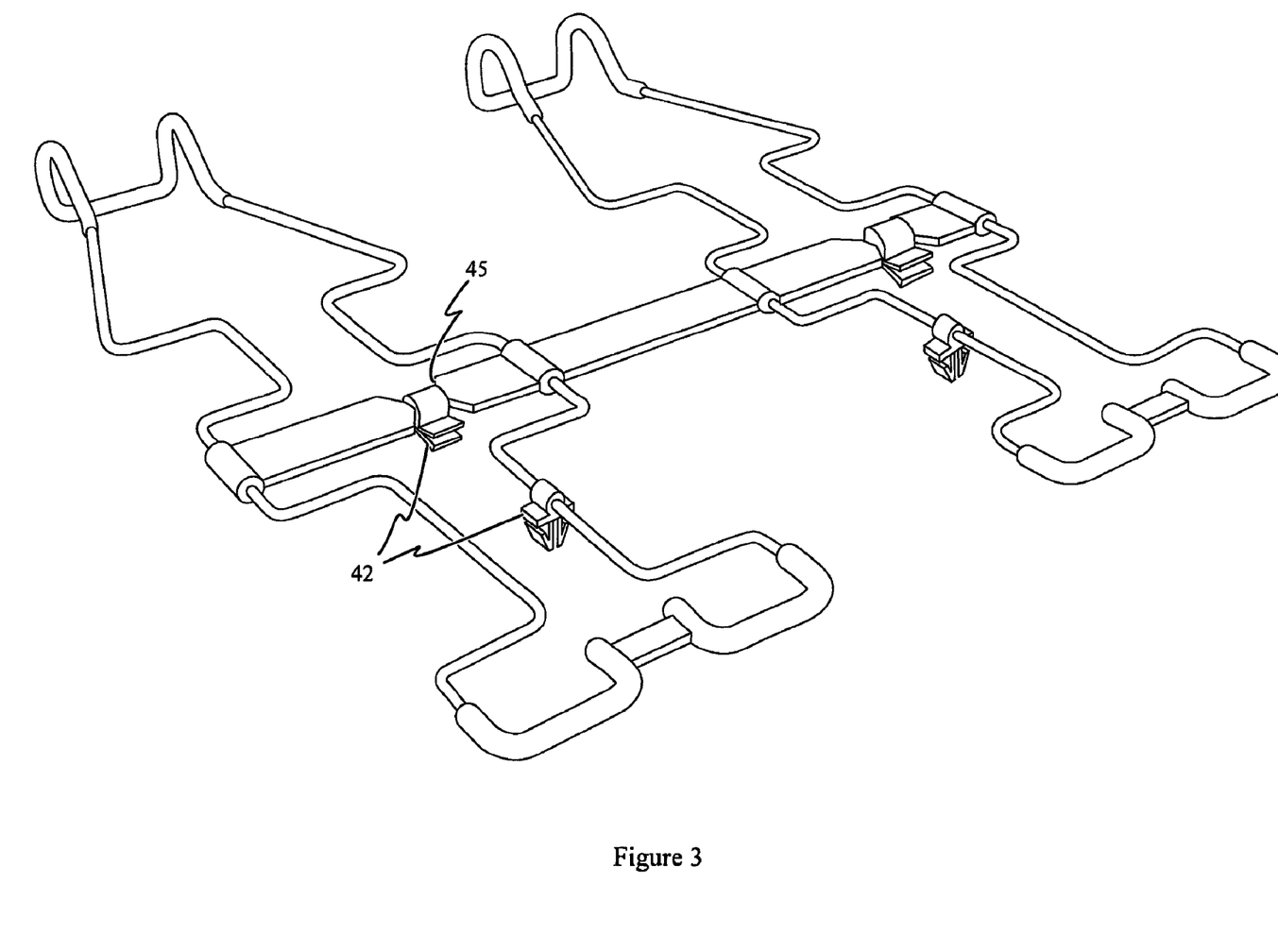
FIG. 3 shows an embodiment of a seat suspension system with rods molded into the cross support for accommodating non-integral attachment clips.

In a first embodiment there is a single cross support 34 overmolded across two support wires 32 (FIG. 1A). In a second embodiment there are two cross supports 34, parallel to one another, overmolded across two support wires (FIGS. 2A, 2B). In the first embodiment the bracket 38 is held onto the support wires 32 by clips molded onto the cross support 34 as well as by separate clips 42 that wrap around the support wire 32 (FIG. 1A). In the second embodiment the bracket 38 is held onto the support wires 32 by clips molded onto each of the cross supports 34 (FIGS. 2A, 2B). In yet another embodiment the cross support 34 may have a wire or rod 45 overmolded therein for supporting attachment clips 42 (FIGS. 3, 5A). In this latter embodiment there is a discontinuity in the cross support 34 such that a portion of the rod 45 is exposed, wherein a non-integral attachment clip 42 may be wrapped around the exposed portion of the rod 45 for subsequent attachment to other components (FIG. 3).

The seat suspension system 20 as well as the cushion module suspension system 30 may differ for the driver's side seat base compared to the passenger's side seat base. For example, the passenger's side seat base may require a less complicated and hence smaller seat cushion module 40, for example only for an occupant sensor for the air-bag system (FIG. 4).

In one embodiment the seat cushion module 40 on the driver's seat has brackets 38 attached to the module box itself to act as attachment 'ears', wherein the brackets 38 are directly coupled to the support wire 32 using appropriate clips 42, 44 (FIG. 1A).

In another embodiment a holding shelf 46 is attached to the support wires 32 during manufacture and assembly of the seat cushion module suspension system 30. The seat cushion module 40 is slid into the holding shelf 46 at a later time as required. To keep the seat cushion module from sliding out of the holding shelf 46, in one embodiment the holding shelf 46 also comprises one or more tabs 48 (FIGS. 5B, 5C). The shelf 46 in one embodiment has one or more brackets 38 for attaching the shelf 46 to the support wire 32, via clips 42, 44. The brackets have appropriate holes 43 of the correct size and shape for receiving clips 42, 44.

Figure 4:
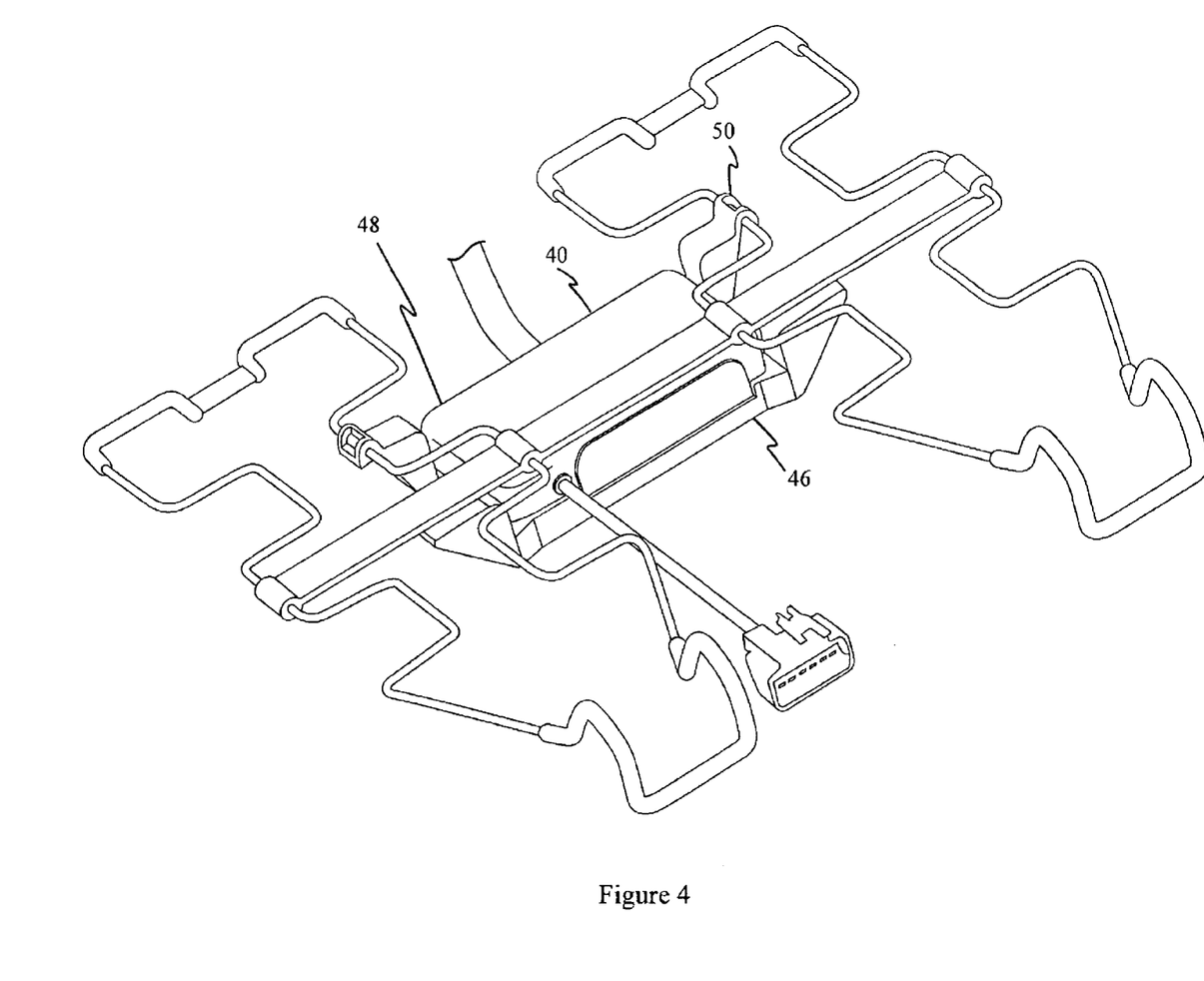
FIG. 4 shows an embodiment of a seat suspension system having a seat cushion module held adjacent thereto using a shelf attached to the support wires.

In one embodiment the holding shelf 46 has two hooks 50 that loop over and hang on the support wires 32 (FIG. 4). The hooks 50 are held in place in part by the foam bun of the seat pushing down on the hooks 50. Securing at least part of the holding shelf 46 in place using such hooks 50 makes it easier to assemble the holding shelf 46 onto the support wires 32. In another embodiment such hooks 50 could be directly attached to the seat cushion module, replacing one or more of the brackets 38, for ease of installation.

Although some of the embodiments disclosed herein teach the use of two cross supports 34 with associated integral clips, in some embodiments it may be preferable to have only part of the seat cushion module 40 attached to the cross support 34 while the remaining attachment points are made via the aforementioned hooks 50 or separate clips 42. In this latter embodiment the connection between the seat cushion module 40 and the support wires 32 is more flexible due to the ability of the hooks 50 and clips 42 to slide relative to the support wires 32. This permits a certain amount of flex and stretch in the support wires 32 which might arise from a person sitting on the seat. Thus in this case it is preferable that the clips 42 are attached to sections of the support wire 32 that are parallel to the long axis of the wire, so that the clips 42 can slide towards or away from the cross support 34 (FIG. 1B).

Using the above-described methods, a seat suspension system 20 which can easily accommodate a variety of seat cushion modules 40 can be made more easily and cheaply compared to using prior art techniques. The seat suspension system 20, including electrical insulation for the suspension wires, can be made in a single overmolding step, while adding a seat cushion module 40 comprises one more assembly step. The techniques described herein eliminate the need for numerous separate injection-molded parts, attachment devices, and sheet metal brackets. The methods of manufacture and assembly disclosed herein also provide for a more secure method of holding the seat cushion modules 40 in place compared to many prior art methods, and eliminate possible interference of the seat suspension system 20 with a frame-mounted module and adds additional space under the seat for storage.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A suspension system for a vehicle seat comprising:
   a support wire;
   a crossbar overmolded on the support wire;
   a plastic coating molded on at least one end of the support wire;
   a non-integral attachment clip non-integrally attached to the support wire;
   an integral attachment clip molded onto the crossbar; and
   a seat cushion module held adjacent the support wire using the integral attachment clip;
   wherein the non-integral attachment clip attaches the seat cushion module to the support wire.

2. The suspension system of claim 1 wherein the crossbar comprises a rod molded therein, wherein a portion of the rod is exposed.

3. The suspension system of claim 2 further comprising an additional non-integral attachment clip wrapped around the exposed portion of the rod.

4. The suspension system of claim 1 wherein the seat cushion module has at least one bracket attached thereto for joining to the integral attachment clip and the non-integral attachment clip.

5. The suspension system of claim 4 wherein the support wire is attached to a seat frame.

6. The suspension system of claim 5 wherein the seat cushion module has at least one hook attached thereto for hanging the seat cushion module on the support wire.

7. The suspension system of claim 1 further comprising a shelf attached to the support wire, wherein the seat cushion module is held adjacent the support wire by the shelf.

8. The suspension system of claim 7 wherein the shelf further comprises at least one tab for holding the seat cushion module in the shelf.

9. The suspension system of claim 8 wherein the shelf further comprises at least one attachment bracket for receiving an attachment clip.

10. The suspension system of claim 9 wherein the shelf further comprises at least one hook for attachment of the shelf to the support wire.

11. A suspension system for a vehicle seat comprising:
    a support wire;
    a crossbar overmolded on the support wire;
    a plastic coating molded on at least one end of the support wire; and
    a non-integral attachment clip non-integrally attached to the support wire;
    wherein the support wire comprises a first end and a second end and the wire is folded approximately in half such that the first and second ends are adjacent one another, wherein the first and second ends are joined to one another by overmolded plastic.

12. The suspension system of claim 11 wherein the support wire further comprises a middle portion between the first and second ends, wherein the middle portion is curved for engagement with a frame of the vehicle seat.

13. The suspension system of claim 12 wherein the middle portion is overmolded with plastic.

14. The suspension system of claim 13 wherein the first and second ends of the support wire are operatively engagable with the frame of the vehicle seat.

15. A suspension system for a vehicle seat comprising:
    a support wire having a first end, a second end, and a middle portion between the first and second ends, such that the support wire is folded approximately in half at the middle portion;
    a coating of overmolded plastic applied to the first and second ends such that the first and second ends are held together by the coating;
    a bend in the middle portion of the support wire to attach the support wire to a frame of the vehicle seat, wherein the bend is coated with overmolded plastic;
    a crossbar overmolded on the support wire;
    an integral attachment clip molded onto the crossbar; and
    a seat cushion module held adjacent the support wire using the integral attachment clip.

16. The suspension system of claim 15 further comprising a non-integral attachment clip for attachment of the seat cushion module to the support wire.

17. The suspension system of claim 16 further comprising a shelf attached to the support wire, wherein the seat cushion module is held adjacent the support wire by the shelf.

18. The suspension system of claim 17 wherein the shelf further comprises a hook for attaching the shelf to the support wire.

* * * * *

UNITED STATES PATENT AND TRADEMARK OFFICE
CERTIFICATE OF CORRECTION

PATENT NO. : 7,775,603 B2 Page 1 of 1
APPLICATION NO. : 11/427672
DATED : August 17, 2010
INVENTOR(S) : Mundell et al.

It is certified that error appears in the above-identified patent and that said Letters Patent is hereby corrected as shown below:

Col. 6 line 20,
In Claim 14, the word "engagable" should be replaced by the word "engaged."

Signed and Sealed this

Sixteenth Day of November, 2010

David J. Kappos
*Director of the United States Patent and Trademark Office*